United States Patent
Allen et al.

(10) Patent No.: US 6,875,360 B2
(45) Date of Patent: Apr. 5, 2005

(54) WATER SOFTENING

(76) Inventors: Anthony Edward Allen, 27 Perryfields Road, Bromsgrove, Worcestershire B61 8SY (GB); Russell Newman, 83 Brynllvan, Gorslas, Llanneli, Carmarthenshire SA14 7HR (GB)

(*) Notice: Subject to any disclaimer, the term of this patent is extended or adjusted under 35 U.S.C. 154(b) by 124 days.

(21) Appl. No.: 10/328,477

(22) Filed: Dec. 24, 2002

(65) Prior Publication Data

US 2004/0118782 A1 Jun. 24, 2004

(51) Int. Cl.$^7$ ................................................. C02F 1/48

(52) U.S. Cl. ..................... 210/695; 210/748; 210/222; 210/243; 204/554; 204/557; 204/660; 204/664; 422/186.01; 336/180

(58) Field of Search .................. 210/695, 748, 210/222, 243; 204/551, 557, 660, 664, 554; 422/186.01; 336/180

(56) References Cited

U.S. PATENT DOCUMENTS

| | | | | |
|---|---|---|---|---|
| 5,074,998 A | * | 12/1991 | De Baat Doelman | ....... 210/222 |
| 5,171,431 A | * | 12/1992 | Schulte | ........................ 210/222 |
| 5,667,677 A | * | 9/1997 | Stefanini | ..................... 210/222 |
| 6,145,542 A | * | 11/2000 | Walker | ........................ 210/222 |
| 6,146,526 A | * | 11/2000 | Pandolfo | ..................... 210/222 |
| 6,743,366 B2 | * | 6/2004 | Telfer et al. | ................. 210/695 |

* cited by examiner

Primary Examiner—David A. Reifsnyder

(57) ABSTRACT

A method and apparatus for water softening utilising magnetic pulses is provided. The magnetic pulses are presented to a volume of water within a water conduit 6 or water container over a predetermined time period with a relaxation time period between successive predetermined time periods of action upon the volume of water. The magnetic pulses are in the range 1.6 to 6.8 KHz and generally presented in a manner whereby the frequency is ramped in discrete frequency shifts over fixed time periods through the predetermined time period in order to facilitate greater water softening action. Normally, each frequency harmonic is initiated by an initiation spike of enhanced magnetic strength.

23 Claims, 4 Drawing Sheets

WATER SOFTENING

The present invention relates to water softening and more particularly to water softening using ultrasonic frequency magnetic signals in order to soften water.

Water condition and in particular water hardness are a particular concern when the variability of such water can alter an end product, accelerated degradation of pipework or machinery or simply create an unappealing scum within the water. A number of techniques are known in order to soften water. These techniques include chemical treatment and use of ultrasonic magnetic signal pulses presented to a flow of water in order to soften that water. There is an aversion to use of chemical softening as this by its nature incorporates potentially undesirable chemicals into the water supply. Non-intrusion techniques utilising ultrasonic magnetic pulses are advantageous but have hitherto been found relatively unreliable.

It should be appreciated that a major constituent part of the water hardness factor is the level of calcium within the water. This calcium is presented both in solution and in particulate form. The particulate form is generally an aesthetic nuisance rather than determinant of the underlying water hardness or softness. Particulate calcium can be removed by appropriate filtering. However, dissolved calcium by its nature cannot be simply filtered by an appropriate mesh but nevertheless constitutes a major factor with regard to water hardness.

Hard water is generally defined on the basis of the proportion of total hardness expressed as the level of calcium carbonate in the water. As indicated above, this definition fails to differentiate between dissolved free calcium in solution and particulate calcium which is in suspension. In such circumstances, using a normal method of measuring water hardness such as titration there is a failure to distinguish between the two forms of calcium, dissolved and particulate. Nevertheless, it will be understood that the problems of scum in the water, poor lathering of soaps along with accumulation of lime scale are generally caused by the reaction of the soluble compounds in the soap with the dissolved free calcium in the water but not with the particulate calcium.

In accordance with the present invention there is provided a method of practically softening water comprising presenting a frequency harmonic comprising a plurality of magnet pulses to a volume of water for a predetermined time period with a relaxation time period between each predetermined period whereby dissolved calcium at least within the volume of water is precipitated out of solution.

Preferably, the frequency harmonic is formed by outputs in the range of 1.5 to 6.8 KHz, most preferably in the range of 1.6 to 6.0 KHz. Normally, the frequency harmonic is ramped over the frequency range. Possibly, such ramping is in discrete steps, most normally seventy steps upwards from a base frequency. Generally, two frequency outputs are provided.

Preferably, the predetermined time period is 5 to 10 minutes most preferably 6 minutes.

Preferably, the relaxation time is 3 to 15 seconds, most preferably 5 seconds. Generally, each predetermined time period for the frequency harmonic is initiated with an initiation spike. Generally, the output spike lasts for a few microseconds.

Also in accordance with the present invention there is provided apparatus comprising a water conduit or container, coupling means to generate magnetic pulses, means coupled to that means for generating magnetic pulses in order to couple such magnetic pulses to the conduit or water container and means to present said magnetic pulses for a predetermined time period with a relaxation period between each predetermined time period.

Typically, the means to provide magnetic pulses presents a frequency harmonic formed from pulses in the range 1.6 to 6.8 KHz. Normally, the frequency harmonic is ramped from a base frequency level through the predetermined time period. Typically, there are discrete frequency harmonic steps in ramping from the base frequency through the predetermined time period. Typically, seventy equal time periods at each discrete frequency shift step are provided in the frequency range.

Generally, the means to couple magnetic pulses to the conduit or water container comprises windings about that conduit or water container. Typically, such windings constitute an antenna for the radio frequency or ultrasonic magnetic pulses. Generally, twenty five turns about the conduit or container are provided. Generally, at least two antennas are provided at spaced locations upon the conduit or container. Typically, such spacing is 120 to 130 cm (about 5 inches). Normally, the two antenna are arranged such that the direction of oscillation constituted by the direction of the windings are substantially opposed with the windings respectively in opposite directions.

Typically, 60 volt stimulation pulses are provided to create the magnetic pulses within the windings of each antenna. Possibly, the electrical current provided being determined by consideration of the water cross-section within the means to couple the magnetic pulses to that water and/or the level of free calcium within the water which requires precipitation out of solution.

In order to avoid lock up or freezing of a beating effect comprising the frequency harmonic the apparatus may include a power reset. This power reset may comprise an astable timer circuit. The astable timer circuit acting to switch off the apparatus periodically at the end of the predetermined period in order to reset and re-initiate frequency harmonic action.

An embodiment of the present invention will now be described by way of example only with reference to accompanying drawings in which.

Figure 1:
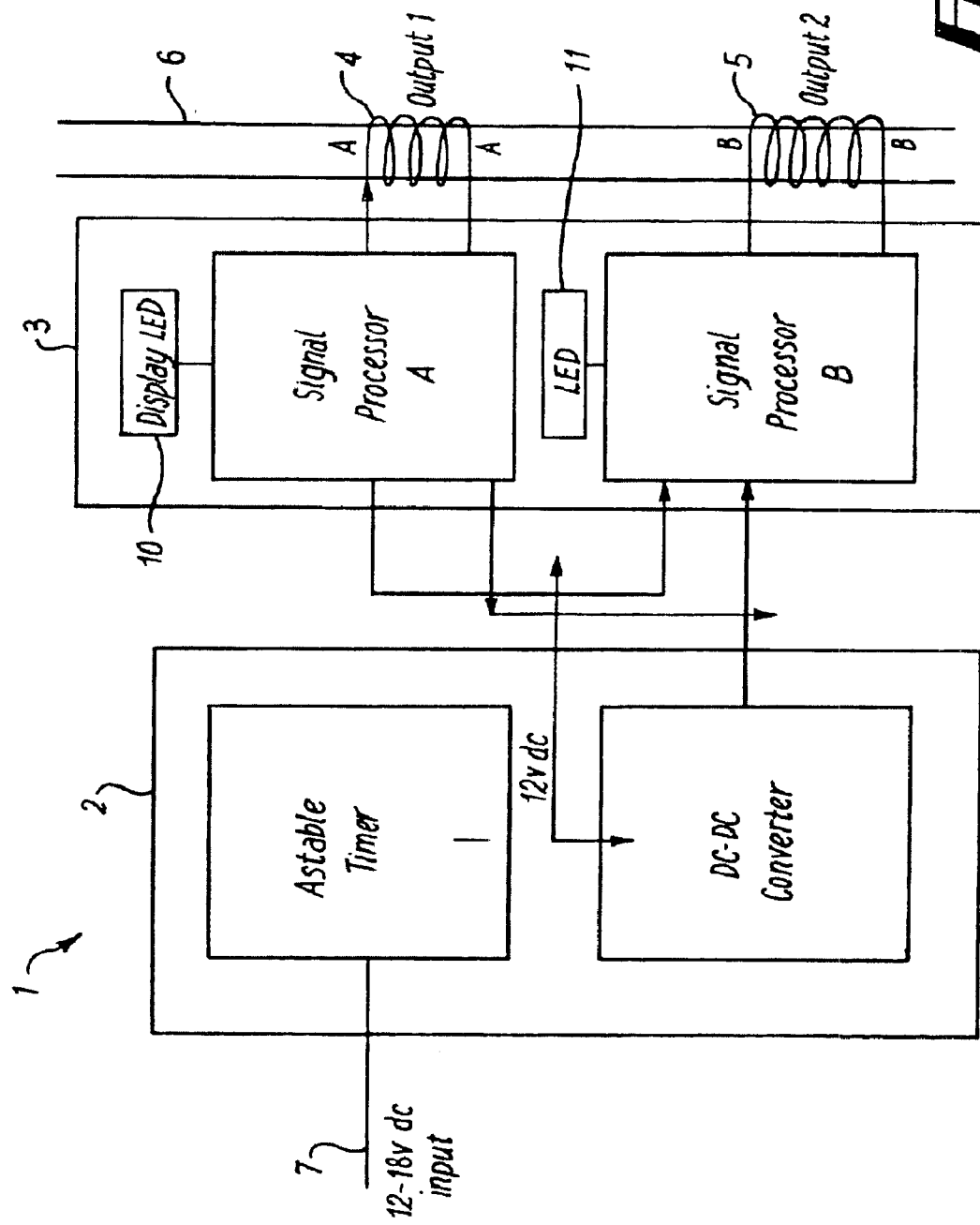
FIG. 1 is a schematic illustration of a water softening apparatus in accordance with the present invention.

Referring to FIG. 1 which is a schematic illustration of a water softening apparatus in accordance with the present invention. Thus, the apparatus substantially comprises an astable timer and DC to DC converter power unit 2 coupled to a signal processor unit 3 which in turn provides electromagnetic pulses through windings 4, 5 about a water flow conduit 6. It will be appreciated that this conduit 6 could be replaced with a water container in some circumstances containing still water.

The unit 2 as indicated above includes an astable timer. This astable timer is set typically with a repeat time period of a predetermined length. Normally, this predetermined time period is 6 minutes during which the signal processor unit 3 is powered. There is a relaxation period of approximately 5 seconds between respective predetermined time periods. Generally, these time periods are set using known techniques by a choice of shunt and multiplier resistors and capacitors associated with an appropriate combination of integrated circuits. An astable timer is required in accordance with the present invention in order to avoid possible "lock up" of the frequency harmonic created through the signal processor unit 3 as a result of component tolerances.

In accordance with the present invention, the signal processor unit 3 creates a frequency harmonic with respect to the magnetic pulses provided through the windings 4, 5. The frequency range is typically from 1.5 KHz to 6.8 KHz with ramping up in discrete frequency shift steps from low frequency to high frequency. Typically, seventy steps of equal time period and frequency shift step up are provided. Normally, the present apparatus 1 is designed to move through the frequency range in the described discrete frequency steps over a 3 minutes time period. In such circumstances, the astable timer unit 2 is designed to reset over a predetermined 6 minute time period. In effect the apparatus operates for the predetermined period such that the effectiveness of the frequency harmonic created through the windings 4, 5 as antenna about the conduit 6 within which water flows is rejuvenated over each predetermined time period.

The power input 7 is generally in the range 12 to 18 volts DC. The circuitry within the timer/power unit 2 will normally incorporate polarity rectification such that the polarity of the input 7 relative to ground is irrelevant. It will be appreciated that the timer/power unit 3 can be configured in order to power a number of signal processor units 3 thereby substantially multiplying the frequency harmonic of the magnetic pulses provided through windings 4, 5 upon the conduit 6. A DC to DC converter 9 in the unit 2 is configured typically using an integrated circuit to allow the input voltage, as indicated in the range 12 to 18 volts, to be stepped up to 60 volts or more if required to boost the output power presented through the signal processor unit 3 in order to create effective magnetic pulses in the frequency harmonic through windings 4, 5.

The signal processor unit 3 typically comprises two programmable integrated circuits. The integrated circuits have complimentary outputs which are connected in parallel in order to present the desired magnetic pulses in the frequency harmonic for processing of water passing through the conduit 6. The clock frequency of one of the integrated circuits is slightly changed using a capacitive trim such that the frequency output appears swept. Furthermore, as indicated previously, the frequency outputs from the processors A, B will be increased in appropriate discrete steps between a typical base frequency in the order of 1.5 KHz to an upper frequency in the order of 6.8 KHz. Generally, seventy discrete frequency shift steps will be provided between that base frequency and the upper frequency. The discrete frequency shifts vary inversely proportional to the time constant over the frequency range. By use of electrical inductors, a reactance load is provided which causes the wave form generated through the processors A, B to be damp with a leading edge spike. This leading edge spike has been found to further increase the efficiency of the present apparatus 1.

Typically, as illustrated in FIG. 1 LED device elements 10, 11 are provided to indicate the frequency output presented through the respective processors A, B. However, these LED elements 10, 11 are independently driven and so may not be a current indicator of the frequency output presented through their respective windings 4, 5.

As can be seen in FIG. 1 the windings 4, 5 are spaced upon the conduit 6. Typically, in the order of 25 turnings are provided for each winding 4, 5. These windings 4, 5 act as an antenna for the electromagnetic pulses in accordance with the swept frequency level in the frequency range of the signal processing unit 3. The windings 4, 5 are wound or coiled in opposite directions with a spacing in the order of 70 to 80 cm. It is found that by providing spaced windings at the antenna that enhanced water softening effects are provided. Furthermore, by provision of two apparatus 1 in accordance with the present invention with the described spaced locations upon the conduit 6 and with appropriate power connection and coupling of frequencies between those respective apparatus 1 there is a further increase in the effects of the magnetic pulsing applied about the water flow in the conduit 6 for increased water softening effectiveness.

At the core of the present invention is the provision of frequency cycling over the frequency range of the magnetic pulses and providing those magnetic pulses for a predetermined time period with an appropriate relaxation time period between successive predetermined time periods. In such circumstances, the full effect of the electromagnetic pulses presented through the windings 4, 5 is maintained. Previously, where electromagnetic pulses have been provided in order to create water softening those electromagnetic pulses have been provided typically of a consistent frequency and continuously. In such circumstances, it has been found that the effectiveness of the magnetic pulses diminished with time and may vary with variations in the currently presented water hardness condition in compared with that at the time the previous magnetic pulse water softening apparatus was calibrated and tuned upon installation. The present invention provides frequency cycling over the frequency range in the discrete steps described as well as avoiding creation of steady or stable beat harmonics within the conduit and therefore water which leads to a steady state condition which may not optimise the desired water softening effect.

In accordance with the present invention as indicated above, dissolved calcium is removed and precipitated into particulate form. This particulate calcium may be removed by appropriate filter meshing or not. Nevertheless, as indicate it is the dissolved free calcium in the water which causes the problems with respect to scum and poor lathering of soaps along with accumulation of lime scale during thermal cycling. In such circumstances, water softening in accordance with the present invention will have a practical effect but with regard to traditional methods of measuring water hardness through titration may still present a relatively high hard water quotient as the water still retains a fair proportion of particulate calcium.

The present invention acts to nucleation clusters of dissolved free calcium within the water by the application of the ultrasonic or high frequency magnetic pulses. Nucleation or conglomeration of the calcium causes precipitation of the dissolved free calcium into clusters which coalesce and float or are suspended as particles within the water. The particles are chemically inert and so do not present the typical hard water problems of scum, poor lathering and lime scale. In such circumstances, the potential health benefits of calcium to water drinkers are maintained and in any event the potentially detrimental effects of chemical treatment upon the water are avoided. The present invention generally utilises the known technology of magnetic pulses to create water softening but ensures through appropriate application of such magnetic pulses that the effectiveness of such water softening is more sustainable and reliable.

In addition to calcium, it will be appreciated that the present apparatus 1 and method of using that apparatus can provide means to drastically reduce or remove the potentially detrimental effects of organic contaminants, sulphates, chlorine, fluoride and iron discolouration along with possibly unpleasant odours.

Figure 2:
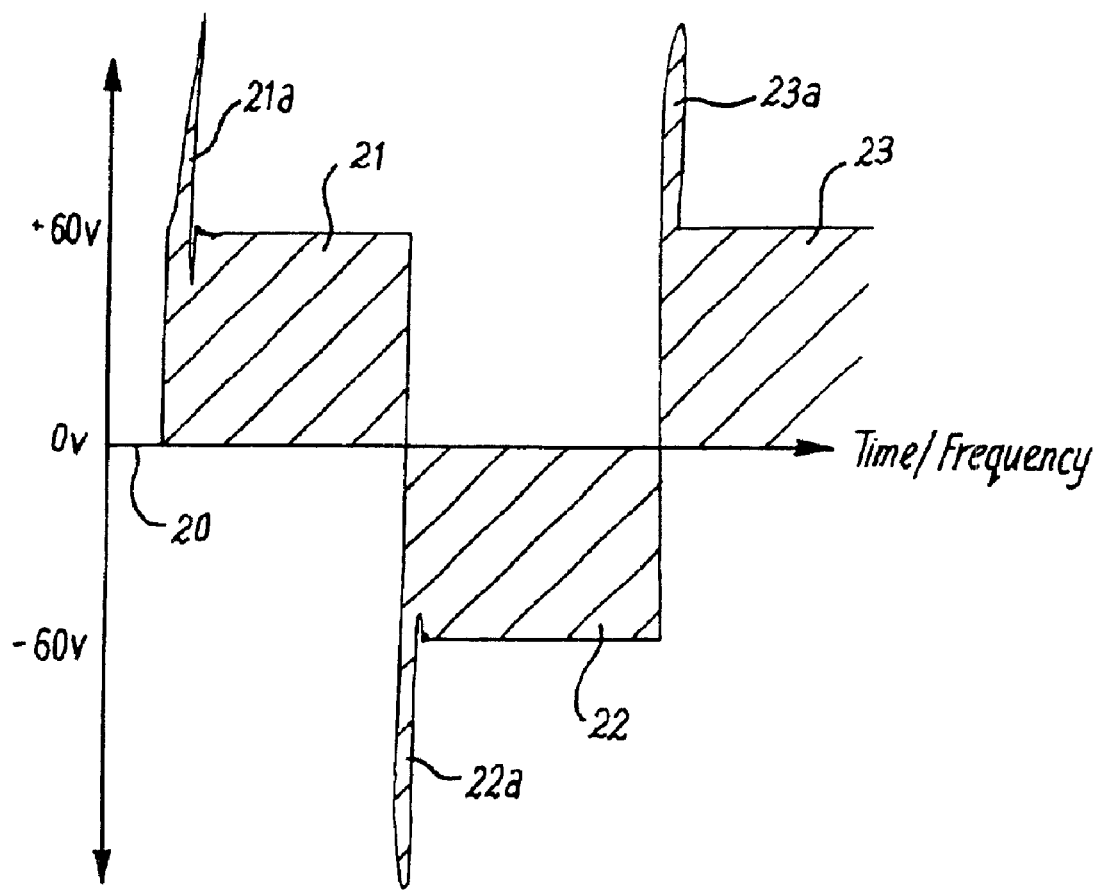
FIG. 2 is a graphic representation of a frequency harmonic output.

FIG. 2 is a graphic representation of successive magnetic pulses in accordance with the present invention. Thus, as can be seen there is an initial start up time period 20 during which the circuitry and oscillators become charged. However, thereafter there are successive electromagnetic pulses harmonic 21, 22, 23 which as indicated previously, act upon the water flow in order to soften it. A distinctive feature with the present invention is the creation of initiation spikes 21a, 22a and 23a. It has been found that these initiation spikes 21a, 22a and 23a to each magnetic pulse harmonic adds to overall water softening efficiency. These initiation spikes are created by use of a small inductance choke (FIG. 3–31) in series with the load resistor such that the magnetic pulse signals are created with a waveform which is transiently "underdamped" such that there is a substantial voltage spike created. This voltage spike which constitutes the initiation spike 21a, 22a, 23a is relatively short lived and has a duration of only a few microseconds but nevertheless as indicated previously seems to disturb static inertia and so create greater nucleation of dissolved free calcium with resultant consolidation and precipitation as particulate calcium of lesser water hardness effect. The same waveform is provided for the magnetic pulses over the whole frequency range.

Figure 4:
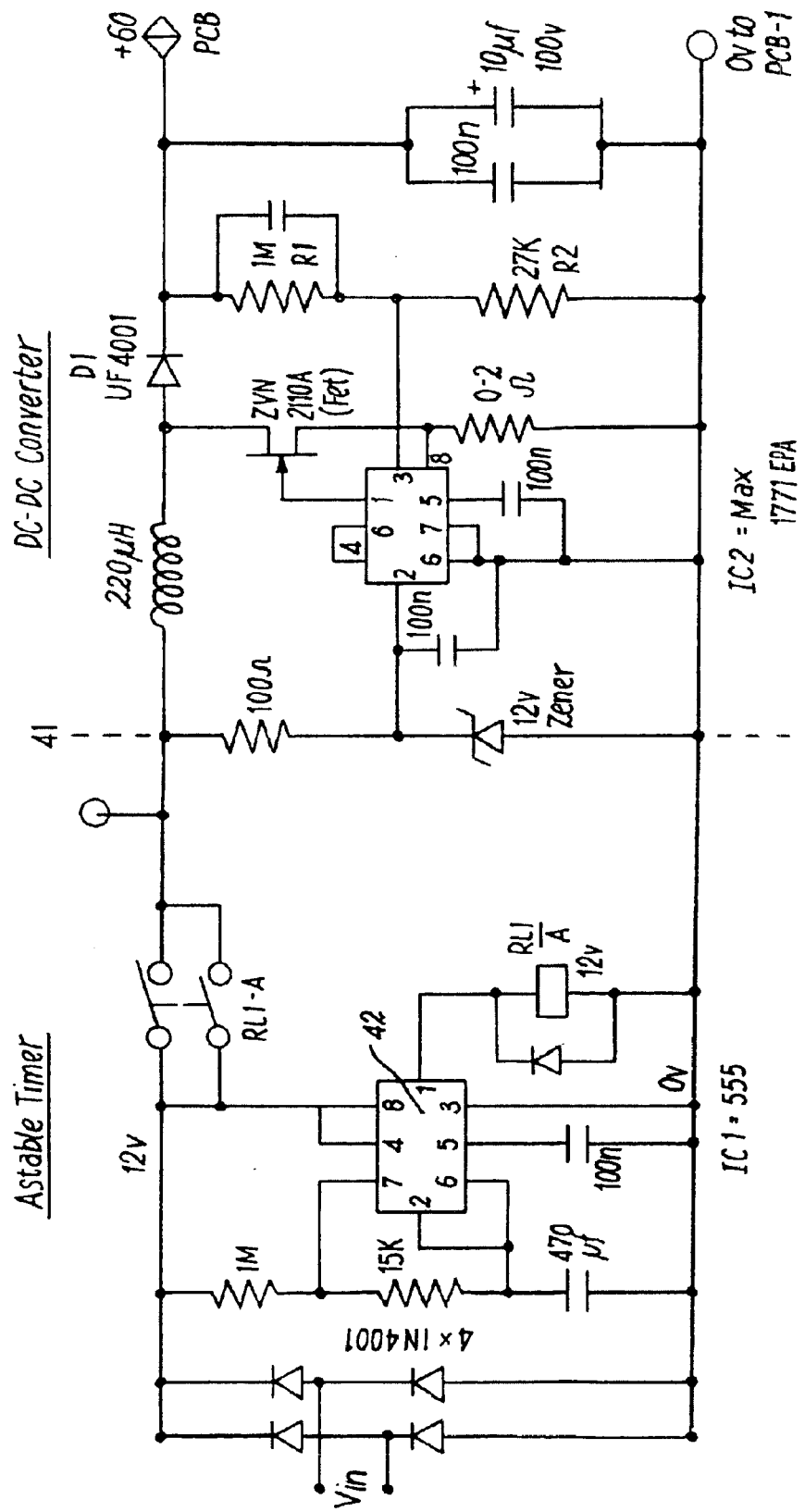

FIG. 4 illustrates an exemplary circuitry for the timer/power unit 2 described schematically in FIG. 1. The circuitry has been divided rudimentary about broken line 41 into the astable timer on one side and the DC to DC converter on the other.

The astable timer substantially comprises a 555 timer integrated circuit 42 which through appropriate combinations of resistors and capacitors are set to provide an astable timer circuit function. This astable timer function is required as described previously to avoid the harmonic beating effect of electromagnetic pulse lock up or freeze within the conduit or container. In short, the timer switches on and off the apparatus at set periods in order to reinitiate and therefore rejuvenate the effectiveness of magnetic pulse cycling upon the water presented through the conduit. As described previously, the electromagnet pulses are cycled over the frequency range during a period of 2 to 3 minutes in appropriate discrete frequency shift steps. In such circumstances, the on to off cycle or predetermined period for the apparatus is appropriately set. For example, the predetermined period may be 6 to 8 minutes whilst there is a 5 to 15 second relaxation or off time between such predetermined period of apparatus operation. However, as described previously, it depends upon the particular water presented and the necessary level of water softening function.

The DC to DC converter is of a conventional format and steps up as described previously the input voltage, which is normally in the range of 12 to 18 volts, to an output voltage in the range of 60 volts presented to the signal processor unit 3 described later with regard to FIG. 3.

The value of 60 volts is determined by the physical possibilities as well as the desire to achieve the necessary current through the windings of the antenna 4, 5 to create an acceptable level of magnetic pulse across the presented cross section of water passing through the conduit or container 6. Clearly, there is a cascade effect in terms of the input voltage feed in and the output voltage from the DC to DC converter upon which the signal processor unit 3 can act in order to present magnetic pulses through the windings or antenna 4, 5.

Figure 3:
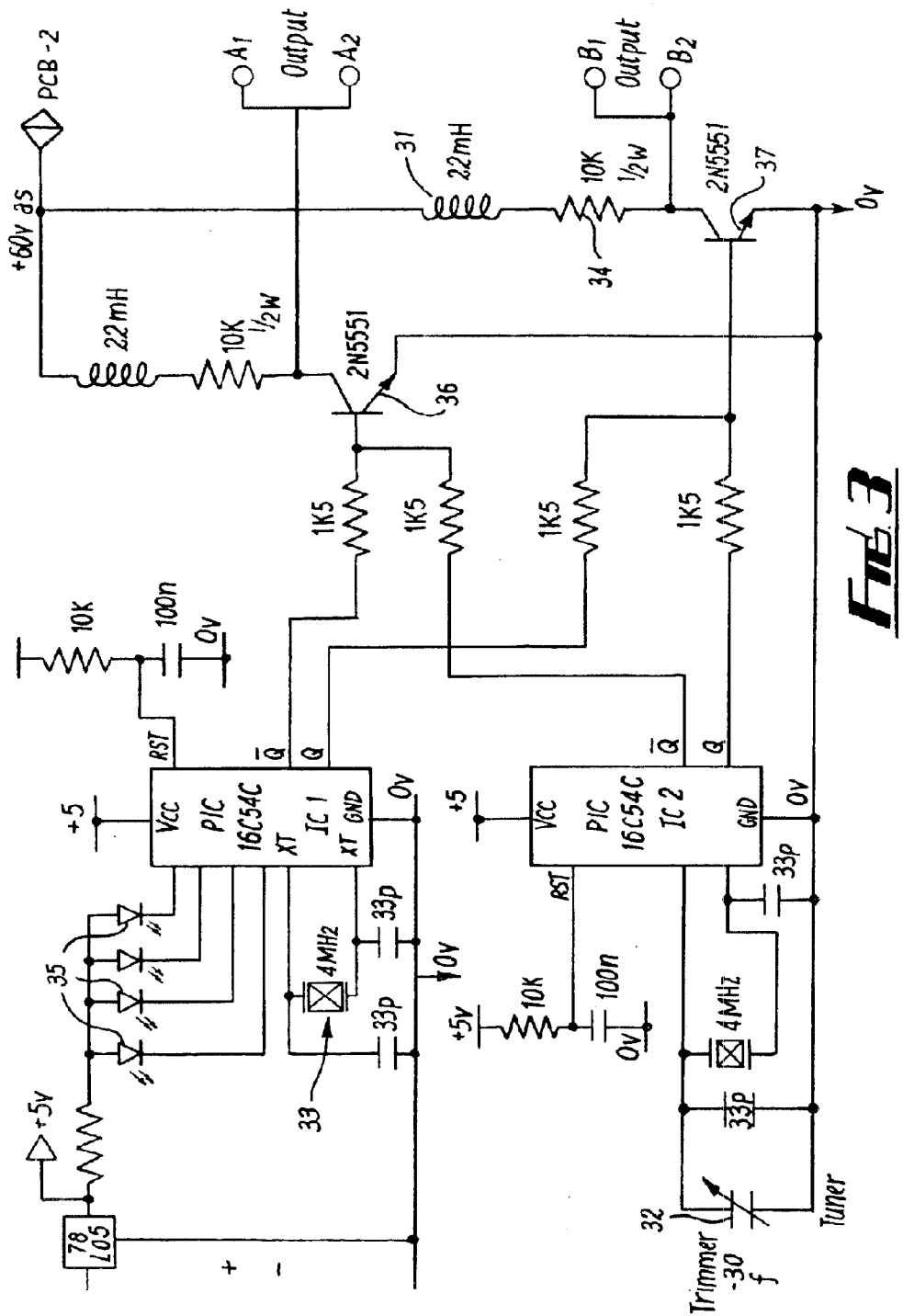
FIG. 3 is an example of a circuit diagram of a principal signal generator in accordance with the present invention; and, FIG. 4 is an example of a circuit diagram of a timer and DC TO DC converter to augment operation of the principal signal generator described with regard to FIGS. 1 and 3.

FIG. 3 is an example circuit for a signal processor unit 3 as described in FIG. 1. The present invention as described above uses a specifically set DC to DC converter in order to create the desired output by a combination of shunt and multiplier resistors etc. Utilising this generally 60 volt output voltage from the DC to DC converter creates the appropriate magnetic pulses through the windings 4, 5.

In accordance with the present invention it is important that the magnetic pulses are swept through the desired frequency range. This sweeping occurs due to the output A1-A2, B1-B2 being in parallel and within the tolerance ranges of the circuitry. The outputs A1-A2, B1-B2 create a harmonic between them which in turn can be considered a sweeping or beating of the magnetic pulses presented to the water in the conduit 6 (FIG. 1). This sweeping or beating of the magnetic pulses may vary and is generally unstable such that a trimming capacitor 32 is provided. Although this trimming capacitor 32 is shown with respect to integrated circuit IC2 in FIG. 3 it is possible that an alternative trimming capacitor could be provided on the first integrated circuit IC1. Nevertheless, by using an accurate crystal oscillator 33 with respect to the first integrated circuit IC1 instead of a less accurate resonator only one trimmer is required. It will be understood that the crystal 33 is a fixed reference so that if two crystal oscillator references were provided it will be difficult to control. In such circumstances, one integrated circuit is fixed while the other is left relatively unstable and trimmed by a capacitor 32 to achieve the desired sweeping.

As indicated previously, an inductance 31 provides a choke in series with a load resistor 34 in order to create the initial or initiation spikes 21a, 22a, 23a (FIG. 2).

Operation of the integrated circuits IC1, IC2 in order to create the necessary frequency harmonic magnetic signal pulses through the outputs to the conduit (6 in FIG. 1) is well known. LEDs 35 will provide an indication of the frequency presented through the output A1-A2 but not necessarily accurately as the driving signals for these LEDs 35 is not taken directly from the output A1-A2. Respective transistors 36, 37 are provided as switches turned on and off by the signals generated by integrated circuits IC1, IC2 in order to draw down the 60 volt signal waveform in order to generate the magnetic pulses in the antenna or windings 4, 5 (FIG. 1). In such circumstances, relatively low currents and voltages can be used on the integrated circuits side of the signal generator and these low currents/voltages used to switch relatively high voltages (60 volts) taken from the astable timer/DC to DC converter described previously.

Although the precise mechanism by which dissolved free calcium is nucleated into a precipitated particle is not known, it is probable the induced magnetic pulses presented through the cross section of water processed creates an atomic electrochemical imbalance which causes alignment and attraction of the free calcium in solution during the magnetic pulses. In such circumstances, due to the relatively low conductivity of calcium once the magnetic pulse is removed the agglomeration of free calcium into a particle is retained by limited or relatively slow electrical charge flow retaining the respective atoms together. Subsequently, there may be parasitic charge removal from the particle through the relatively conductive water substrate to other elements such that the calcium particles are slightly charged, either negatively or positively and so have an inherent reluctance to disassociate. Clearly, over a period of time, if there is such charging of the calcium particles that charging is slowly released in order to leave a substantially neutral and stable calcium particle in suspension within the water. As indicated previously, calcium is a relatively inert element and so in itself as a particle does not provide a practical water hardness effect in terms of scum, poor lathering and accumulation of lime scale upon thermal cycling of the water.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A method of practically softening water comprising presenting a frequency harmonic comprising a plurality of magnetic pulses to a volume of water for a predetermined time period with a relaxation time period between each predetermined time period whereby dissolved calcium at least within the volume of water is precipitated out of solution, wherein the predetermined time period is 5 to 10 minutes and the relaxation time period is 3 to 15 seconds.

2. A method as claimed in claim 1, wherein the frequency harmonic is formed by outputs in the range 1.5 to 6.8 kHz.

3. A method as claimed in claim 2, wherein the frequency harmonic is formed by outputs in the range 1.6 to 6.0 kHz.

4. A method as claimed in claim 1, wherein the frequency harmonic is ramped over the frequency range during the predetermined time period.

5. A method as claimed in claim 4, wherein the ramping is in discrete steps upwards from a base frequency.

6. A method as claimed in claim 1, wherein two frequency outputs are provided in order to create the frequency harmonic.

7. A method as claimed in claim 1, wherein the predetermined time period is 6 minutes.

8. A method as claimed in claim 1, wherein the relaxation time period is 5 seconds.

9. A method as claimed in claim 1, wherein each predetermined time period for the frequency harmonic is initiated with a short term initiation frequency spike.

10. A method as claimed in claim 9, wherein the initiation spike is a transient which lasts for no longer than a few microseconds.

11. Water softening apparatus comprising a water conduit or container, means to generate magnetic pulses, coupling means coupled to that means for generating magnetic pulses in order to couple such magnetic pulses to the conduit or water container and means to present said magnetic pulses for a predetermined time period with a relaxation period between each predetermined time period, wherein the means to generate magnetic pulses incorporates means to avoid lock up or freezing of a beating effect within the frequency harmonic, that means avoiding such lock up or freezing of a beating effect comprising an astable timer circuit to power reset the apparatus periodically, and wherein the astable timer circuit acts to switch off the apparatus periodically at the end of the predetermined time period in order to reset the apparatus at the beginning of the predetermined time period and reinitiate frequency harmonic action.

12. Apparatus as claimed in claim 11, wherein the means to provide magnetic pulses comprises a frequency harmonic formed from pulses in the range 1.5 to 6.8 kHz.

13. Apparatus as claimed in claim 11, wherein the means for generating magnetic pulses is ramped whereby the frequency harmonic is shifted from a base frequency level through the predetermined time period.

14. Apparatus as claimed in claim 11, wherein the means for generating magnetic pulses is ramped from the base frequency through the predetermined time period in discrete frequency harmonic shift steps.

15. Apparatus as claimed in claim 14, wherein there are seventy discrete frequency harmonic shift steps comprising discrete frequency shifts and these shifts are provided at equal fixed time periods through the predetermined time period.

16. Apparatus as claimed in claim 11, wherein the means to couple magnetic pulses to the conduit or water container comprise windings about the conduit or water container.

17. Apparatus as claimed in claim 16, wherein the windings constitute an antenna for radio frequency or ultrasonic magnetic pulses.

18. Apparatus as claimed in claim 17, wherein the windings comprise twenty five turns about the conduit or container.

19. Apparatus as claimed in claim 16, wherein at least two windings are provided at spaced locations upon the conduit or container.

20. Apparatus as claimed in claim 19, wherein the spacing between windings is in the range 120 to 130 cm.

21. Apparatus as claimed in claim 19, wherein the two windings are arranged such that the direction of oscillation constituted by the direction of the windings are substantially opposed with the windings respectively in opposite directions as presented to the conduit or container.

22. Apparatus as claimed in claim 11, wherein the magnetic Pulses are caused by 60 volt stimulation pulses from the means to generate the magnetic pulses.

23. Apparatus as claimed in claim 11, wherein the means to generate the magnetic pulses provides an electric current in order to generate those magnetic pulses which is determined by consideration of the water cross-section within the conduit or container within the means to couple the magnetic pulses to that water and/or the level of free calcium within the water which requires precipitation out of solution.

* * * * *